(12) United States Patent
Müller et al.

(10) Patent No.: US 11,414,894 B2
(45) Date of Patent: Aug. 16, 2022

(54) TWO-WHEELER LOCK

(71) Applicant: ABUS August Bremicker Söhne KG, Wetter-Volmarstein (DE)

(72) Inventors: Marvin Müller, Salz (DE); Marcus Kolb, Girod (DE)

(73) Assignee: ABUS AUGUST BREMICKER SÖHNE KG, Wetter-Volmarstein (DE)

( * ) Notice: Subject to any disclaimer, the term of this patent is extended or adjusted under 35 U.S.C. 154(b) by 335 days.

(21) Appl. No.: 16/552,476

(22) Filed: Aug. 27, 2019

(65) Prior Publication Data

US 2020/0070912 A1   Mar. 5, 2020

(30) Foreign Application Priority Data

Aug. 30, 2018   (DE) .......................... 102018121245.3

(51) Int. Cl.
*E05B 71/00* (2006.01)
*B62H 5/14* (2006.01)
(Continued)

(52) U.S. Cl.
CPC ............. *E05B 71/00* (2013.01); *B62H 5/141* (2013.01); *B62H 5/147* (2013.01); *B62H 5/20* (2013.01);
(Continued)

(58) Field of Classification Search
CPC ............... E05B 45/005; E05B 47/0001; E05B 47/0012; E05B 47/0603; E05B 71/00;
(Continued)

(56) References Cited

U.S. PATENT DOCUMENTS 4,536,754 A * 8/1985 Holce ...................... B62H 5/20
340/568.2
4,920,334 A * 4/1990 DeVolpi ................... B62H 5/20
340/427
(Continued)

FOREIGN PATENT DOCUMENTS

CN   1924271 A   3/2007
CN   1963125 A   5/2007
(Continued)

OTHER PUBLICATIONS

EP Search Report; Appl. No. 19191836.6; dated Dec. 13, 2019; 3 pages.
(Continued)

*Primary Examiner* — Christopher J Boswell
(74) *Attorney, Agent, or Firm* — Dickinson Wright PLLC

(57) ABSTRACT

A two-wheeler lock, in particular a frame lock, wherein the lock is preferably at least partly drivable in a motorized manner, comprises a sensor for detecting different positions of an element of the lock movable along a defined movement path. The movable element here has a permanent magnet and the sensor is configured as a magnetic sensor. This magnetic sensor is furthermore configured for a three-dimensional magnetic detection to detect positions or movements of the movable element deviating from the defined movement path and/or to detect manipulation attempts by means of external magnets.

13 Claims, 3 Drawing Sheets

Figure 1:
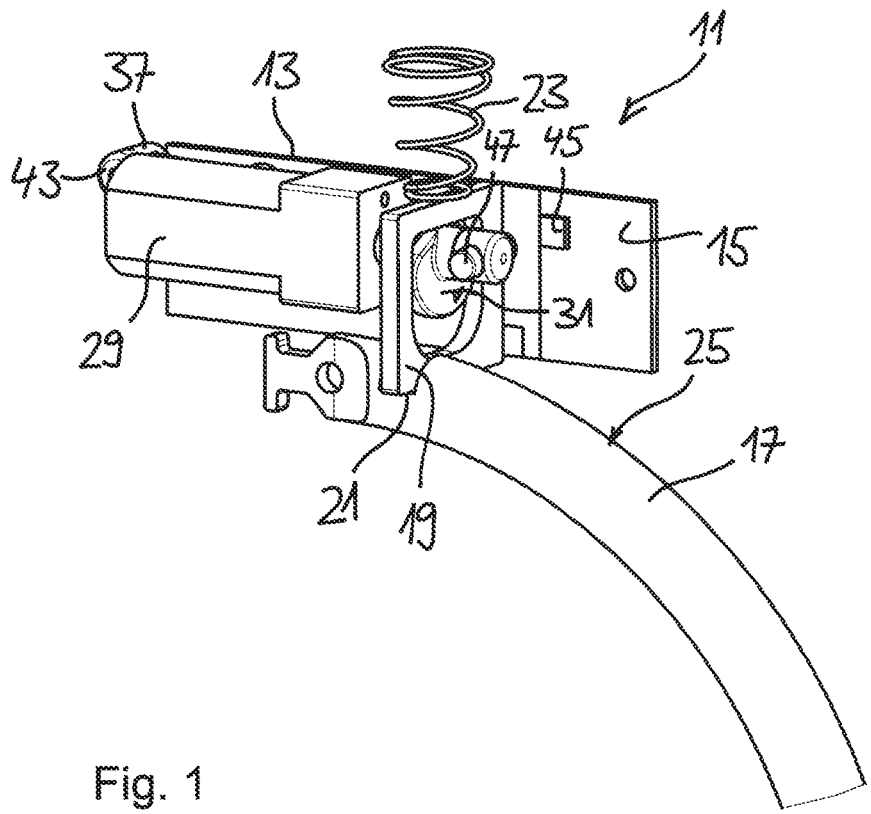

(51) Int. Cl.
  *E05B 45/00* (2006.01)
  *B62H 5/20* (2006.01)
  *E05B 47/00* (2006.01)
  *B62J 45/41* (2020.01)
  *E05B 47/06* (2006.01)
  *E05B 45/06* (2006.01)

(52) U.S. Cl.
  CPC ............. *B62J 45/41* (2020.02); *E05B 45/005* (2013.01); *E05B 47/0001* (2013.01); *E05B 47/0603* (2013.01); *E05B 2045/0665* (2013.01); *E05B 2047/0069* (2013.01)

(58) Field of Classification Search
  CPC ..... E05B 2045/0665; E05B 2047/0069; E05B 2047/0092; B62H 5/00; B62H 5/147; B62H 5/20
  See application file for complete search history.

(56) References Cited

U.S. PATENT DOCUMENTS

| | | | | |
|---|---|---|---|---|
| 5,408,213 | A * | 4/1995 | Ungarsohn | B62H 5/20 340/427 |
| 5,917,407 | A * | 6/1999 | Squire | B62H 5/20 340/432 |
| 9,512,649 | B2 * | 12/2016 | Mohamed | E05B 71/00 |
| 10,549,801 | B2 * | 2/2020 | Lee | E05B 71/00 |
| 10,577,834 | B1 * | 3/2020 | Luedtke | E05B 71/00 |
| 10,858,864 | B2 * | 12/2020 | Pfunder | E05B 47/0012 |
| 10,968,660 | B2 * | 4/2021 | Maiga | E05B 47/0001 |
| 11,066,117 | B2 * | 7/2021 | Hu | E05B 71/00 |
| 2008/0036596 | A1 | 2/2008 | Auerbach | |
| 2014/0266588 | A1 | 9/2014 | Majzoobi | |

FOREIGN PATENT DOCUMENTS

| | | | |
|---|---|---|---|
| CN | 201100043 Y | * | 8/2008 |
| CN | 202227816 U | | 5/2012 |
| CN | 202578224 U | | 12/2012 |
| CN | 103786809 A | | 5/2014 |
| CN | 105401798 A | | 3/2016 |
| CN | 205078020 U | | 3/2016 |
| CN | 205632760 U | | 10/2016 |
| CN | 106948668 A | | 7/2017 |
| CN | 107386814 A | | 11/2017 |
| DE | 10026701 A1 | | 12/2001 |
| DE | 10252080 A1 | | 5/2004 |
| DE | 102005040066 A1 | | 3/2007 |
| DE | 102005043927 A1 | | 3/2007 |
| DE | 102007035122 A1 | | 1/2009 |
| DE | 102011015313 A1 | | 10/2012 |
| DE | 102012002903 A1 | | 8/2013 |
| KR | 20180015541 A | | 2/2018 |

OTHER PUBLICATIONS

Chinese Office Action form the Chinese Patent Office for related Chinese Application No. 201910782391.X dated Jun. 22, 2021, 10 page(s).

* cited by examiner

TWO-WHEELER LOCK

CROSS-REFERENCES TO RELATED APPLICATIONS

This application claims the benefit and priority of German Patent Application Serial No. 102018121245.3 filed Aug. 30, 2018, the entire disclosure of which is incorporated herein by reference.

FIELD

The present invention relates to a two-wheeler lock, in particular to a frame lock for a two-wheeler.

The two-wheeler lock has at least one element that is movable along a defined movement path. Such a lock can in particular comprise a lock body, a hoop that is movable, and is in particular supported or at least guided, between an open position and a closed position, and a latch that is movably supported at the lock body between a locked position in which in its closed position it blocks the hoop against a departure from the closed position and an unlocked position in which it releases the hoop.

In its closed position, the hoop, for example, serves to secure a two-wheeler by means of the lock, e.g. to connect it to another object or to block a movement of the two-wheeler, for instance in the manner of a spoke lock that prevents the rotation of a wheel. The latch, in contrast, typically does not cooperate with objects outside the lock, but rather with the hoop and serves to block or release the hoop, in particular in the closed position, depending on whether the lock is locked or unlocked.

Such a two-wheeler lock can be configured as semi-automatic or fully automatic to improve comfort, with it being at least partly drivable by a motor. This means that at least individual elements of the lock can be moved in a motorized manner by one or more drive motors of the lock. However, every movable element of the lock does not have to be drivable in a motorized manner. As a rule, such a lock can at least be unlocked in a motorized manner, i.e. the latch is displaceable in a motorized manner from the locked position into the unlocked position to release the hoop for a departure from its closed position. The latch can, however, additionally or alternatively, also be displaceable in a motorized manner in the opposite direction. Provision can additionally be made that the hoop can (also) be moved in a motorized manner.

To be able to reliably move the element of the lock that is drivable in a motorized manner, it is expedient to be able to detect information on the respective current position of the element. It can also be desired with a lock that is not drivable in a motorized manner to detect the respective current state of the lock with reference to the position of one or more movable elements of the lock. For this purpose, for example, a sensor can be provided that is configured to detect different positions of at least one element of the lock movable along a defined movement path. The sensor can in particular be used to detect the latch position. If the latch can only adopt certain positions such as the locked position when the hoop is in a specific position, e.g. in the closed position, the position of the hoop can also be indirectly detectable by means of the sensor detecting the latch position.

The sensor can, for example, be configured as a magnetic sensor that cooperates with a permanent magnet provided at the movable element. The defined movement path of the movable element is then defined by the movement path of the permanent magnet through which it runs on a regular movement of the element along its movement path. A simple magnetic switch can generally be used as a sensor that switches in dependence on the spacing between the permanent magnet and the sensor so that it is possible to differentiate between the presence and the absence of a certain position of the movable element with reference to the switch state.

SUMMARY

It is an object of the invention to provide a two-wheeler lock that is in particular at least partly drivable in a motorized manner and that has an improved security against manipulation attempts.

The object is satisfied by a two-wheeler lock having the features of claim 1, by a method of detecting manipulation attempts having the features of claim 9, and by a use in accordance with claim 12. Advantageous embodiments of the invention result from the dependent claims, from the Figures, and from the present description.

In the two-wheeler lock in accordance with the invention, the sensor of the lock configured as a magnetic sensor is configured for a three-dimensional magnetic detection to detect positions of the movable element differing from the defined movement path and/or manipulation attempts carried out by means of external magnets. The fact that the sensor is configured for a three-dimensional magnetic detection means, for example, that it is possible to determine the position of a permanent magnet in space, specifically in three dimensions, by means of the sensor and/or that not only the strength of the magnetic field can be determined by means of the sensor, but also its spatial orientation, for instance as a three-dimensional vector. To this extent, such a magnetic 3D sensor provides more differentiated information than a simple magnetic switch, but also more than a magnetic sensor that can only detect the spacing of a permanent magnet from the sensor or only the absolute amount of the strength of a magnetic field. Due to the more exhaustive information that a sensor configured for a three-dimensional magnetic detection provides, more than only two states (presence or absence of a specific position) of the movable element can also be distinguished by means of a single such sensor and spatial movement progressions can also advantageously be reproduced.

These advantages of magnetic sensors that are configured for a three-dimensional magnetic detection are, however, not only useful for a particularly reliable detection of the position of the detected movable element, but also contribute to the improvement of the security of the lock against manipulation attempts, in particular against attempts to open the locked lock in an unauthorized and irregular manner. For an irregular actuation of the lock can, for example, have the result that an element movable along a defined movement path departs from its movement path and thus adopts positions that cannot be associated with the movement path. The irregular actuation can then be determined with reference to such a deviation that remains unrecognized on a use of a conventional magnetic switch or magnetic sensor, but can be detected by means of a sensor configured for a three-dimensional magnetic detection.

However, even if the movable element whose position is detected does not completely depart from the movement path, a manipulation attempt may be present that can be determined by means of a 3D magnetic sensor. For example, mechanical actions on the lock such as a break-open attempt can result in vibrations that can be superposed on the movement of the movable element along its movement path. The movement can e.g. then have unusual vibration components transversely to the direction of movement along the movement path. Or the manipulation attempt has the result that the time progression changes according to which the movement path is run through. For example, a break-open attempt can have the consequence that the movable element does not as usual continuously run through the movement path, but the movement progression, in particular a speed progression of the movement, has decelerations, accelerations, modulations or interruptions that would not be expected with a regular actuation, or at least not at those positions at which they occur.

In addition to the determination of such movements or positions of the movable element differing from the expectation, a 3D magnetic sensor can advantageously also, additionally or alternatively, be used to detect manipulation attempts directly with respect to a detected magnetic field without reference to the position of the movable element. For on certain manipulation attempts, magnets are led up to the lock from the outside to move elements of the lock by means of such external magnets, to switch magnetic switches, to interfere with electronics of the lock and/or to trigger control commands, in particular to ultimately open the lock in an unauthorized manner. The magnetic field caused by an external magnet can, however, be recognized by means of the sensor configured for a three-dimensional magnetic detection as a deviation from the magnetic fields that are typically present on a regular actuation of the lock that indicates a manipulation attempt. For unlike with magnetic switches that can only distinguish between two states and with one-dimensional magnetic sensors that only detect a single value, e.g. only a spacing or only the strength of the magnetic field, the three-dimensional detection makes it possible to reliably distinguish the magnetic field of an external magnet from the magnetic field of the permanent magnet provided at the movable element.

The movable element whose position along its defined regular movement path is detected by means of the sensor can in particular be one of the following elements of a respective lock: a hoop movable between an open position and a closed position; a latch movable between a locked position and an unlocked position to latch the hoop in the closed position; a transmission element for the drive-effective coupling of the latch or of the hoop to a drive motor of the lock; or a coupling element movement-coupled to the latch, to the hoop, or to the transmission element. The transmission element can, for example, be an eccentric mechanism that is drive-effectively coupled to an output shaft of the drive motor and that can displace the latch in dependence on the rotational position such that the position of the drive motor and, where there is a clear relationship between positions of the eccentric mechanism and positions of the latch, also the position of the latch can be indirectly detected with reference to the position of the eccentric mechanism. The coupling element can, for example, be a pivotably supported lever that, on the one hand, is e.g. movement-coupled to the latch and, on the other hand, has the permanent magnet with which the sensor cooperates so that the position of the latch and, where there is a clear relationship between positions of the latch and positions of the hoop, the position of the hoop can also be indirectly detected with reference to the position of the lever.

The two-wheeler lock can be a portable lock or can be fixedly mounted at the two-wheeler. The two-wheeler lock can in particular be configured as a frame lock. Such a frame lock can, for example, have a rotatable hoop (such as known from DE 10252080 A1), as a pivot hoop (such as known from DE 102011015313 A1), or as a linearly movable hoop (such as known from DE 102012002903 A1). Alternatively to this, the two-wheeler lock can be configured as a U hoop lock (such as known from DE 100 26 701 A1 or DE 10 2007 035 122 A1), as a folding lock having a jointed bar (such as known from DE 102005040066 A1), or as a brake disk lock (such as known from DE 102005043927 A1).

In accordance with an advantageous embodiment, the magnetic sensor is configured as a 3D magnetic field sensor or as a 3D Hall sensor. Conventional magnetic sensors detect the magnetic field in a single direction that is predefined by the position of the sensor. In contrast, the magnetic field can advantageously be detected in three spatial directions by means of a 3D magnetic field sensor, in particular by means of a 3D Hall sensor. Since the movement of a permanent magnet always results in a change of the magnetic field in at least one spatial direction, the position of a permanent magnet in space can in particular be three-dimensionally detected in this manner and its movement in space can be reproduced.

In accordance with a further advantageous embodiment, the movable element is supported such that it has a single degree of freedom. In other words, at least on a regular use of the lock, the element can only move on its defined movement path (except for possible slight play) that in particular does not have any branches. The defined movement path along which the element can move can, for instance, correspond to a continuous line in space. The degree of freedom can e.g. be a purely translatory, a purely rotary, or a combined translatory and rotary degree of freedom. Provision can, for example, be made that said eccentric mechanism or a permanent magnet provided thereat has a purely rotary degree of freedom. With a pivotably supported lever that is movement-coupled to the latch of the lock, a permanent magnet arranged at an end of the lever can run through a partial arc path and can to this extent have a combined translatory and rotary degree of freedom. The restriction of the movability of the movable element to a single degree of freedom (at least on a regular use) simplifies the recognition of irregular states since a plurality of positions of the permanent magnet or a plurality of states of the magnetic field can be excluded by this restriction so that a conclusion can be drawn on a manipulation attempt if it is detected by means of the sensor that one of the actually excluded states is nevertheless present.

It is furthermore advantageous if in accordance with a further embodiment the lock comprises an evaluation apparatus that is configured to evaluate a measured magnetic value detected by means of the sensor with respect to an agreement with a measured value to be expected for one of the positions of the movable element along the defined movement path. A measured value is in particular not to be expected if it does not correspond to any of the positions of the movable element along the defined movement path. The measured value can, however, also not be expected if there is admittedly a position along the defined movement that could form the basis of the detected measured value, but this position should not be present in the current state of the lock. E.g. when the latch is preloaded into a locked position blocking the hoop and it is known or detected that the hoop is closed and that the drive motor and the eccentric mechanism currently do not displace or hold the latch against the preload, it is to be expected that the latch is in its locked position on the basis of the preload. A detected measured value that corresponds to the unlocked position of the latch, then admittedly generally corresponds to a regular latch position, but then nevertheless represents a deviation from the measured value currently to be expected.

Even if a manipulation attempt takes place at the lock by means of an external magnet, this will as a rule have the result that a measured value is detected by means of the sensor configured for a three-dimensional magnetic detection that differs from all the measured values corresponding to a position of the movable element along its defined movement path, but at least differs from that measured value that would currently be expected for the actual position of the movable element. The evaluation apparatus can thus advantageously determine the presence of a manipulation attempt with reference to the then consequent lack of agreement of the detected measured magnetic value with a measured value to be expected.

In accordance with a further advantageous embodiment, the lock further comprises an alarm apparatus for outputting an alarm, with the evaluation apparatus being configured to control the alarm apparatus to output an alarm when no agreement is determined on an evaluation of a detected measured value with a measured value to be expected for one of the positions of the movable element along the defined movement path. The determination of a manipulation attempt by the evaluation apparatus can thus also result in a reaction by which the manipulation attempt can be counteracted. The alarm can be an acoustic and/or an optical alarm signal that is output by the lock, for instance to warn the person making the manipulation attempt and/or to draw the attention of persons in the environment of the lock to the manipulation attempt. The alarm can also comprise a radio signal via which the determination of a manipulation attempt can be reported over a certain distance, in particular to the owner of the lock. Provision can additionally be made that an internal reaction of the lock to the manipulation attempt is triggered by the transmitted alarm. Expanded protective mechanisms of the lock can, for example, thereupon be activated.

The method in accordance with the invention is configured to detect manipulation attempts at a two-wheeler lock, in particular a frame lock, wherein the lock, that is preferably at least partly drivable in a motorized manner and is preferably configured in accordance with one of the above-described embodiments, has a sensor for a three-dimensional magnetic detection of different positions of an element of the lock movable along a defined movement path. The method comprises the steps: detecting a magnetic measured value by means of the sensor; evaluating the detected measured value with respect to an agreement with a measured value to be expected for one of the positions of the movable element along the defined movement path; associating a respective position of the movable element with the measured value if an agreement is present; and otherwise determining a manipulation attempt.

The method thus has substantial points of agreement with the above-described use possibilities of the two-wheeler lock in accordance with the invention. To this extent, the possibilities of the configuration described there and of the use of the lock and its respective advantages also apply correspondingly to the method. A detected measured value is in particular evaluated in accordance with the method, for example, by means of said evaluation apparatus in that a check is made whether an agreement is present of the detected measured value with the measured value to be expected. In this respect, a measured value is in particular not to be expected if it does not result from a position of the movable element along its defined movement path.

Provision can be made that a data set of stored measured values that correspond to different positions of the movable element along its movement path is present so that a check can be made for the evaluation whether the detected measured value agrees with one of the measured values of the data set. Such a data set can, for example, be determined by moving the element along its defined regular movement path and by detecting the corresponding measured values by means of the sensor in the sense of at least a one-time teaching and can be stored. Said association of a respective position with the detected measured value can take place in that that position is associated with the detected measured value that forms the basis of that stored measured value that agrees with the detected measured value. The evaluation and/or association can, however, also take place by calculation, for instance on the basis of the detected measured value and the known movement path of the element with reference to geometrical and/or physical relationships.

If the evaluation shows that an agreement of the detected measured value with a measured value to be expected is present, the corresponding position of the movable element is associated with the detected measured value so that said position can be output and used. The position determined in this manner can, for example, serve for the monitoring of the respective state of the lock. In addition, the determined position can be used as feedback as part of a regulated control of a drive motor of the lock. The currently present position can also be used to determine which positions can be present next, starting from this position, and thus what measured values of the magnetic sensor are to be expected next.

If, in contrast, the evaluation shows that no agreement is present, this is evaluated as an indication of the presence of a manipulation attempt. In accordance with an advantageous embodiment of the method, provision is made that an alarm is output in this case. As described above, this alarm can serve, e.g. in the form of an acoustic and/or optical alarm signal, to draw attention to the manipulation attempt and to warn the person that is making the manipulation attempt and/or can serve to trigger a countermeasure against the manipulation attempt. The alarm is preferably output toward the outside of the lock here. The alarm can, however, generally also only be output internally and can then preferably trigger a countermeasure in the lock.

The invention further relates to the use of a sensor configured for a three-dimensional magnetic detection in a two-wheeler lock, in particular in a frame lock, wherein the lock is preferably at least partly drivable in a motorized manner, and wherein the sensor detects different positions of an element of the lock movable along a defined movement path to detect manipulation attempts with reference to a deviation of a measured value detected by means of the sensor from a measured value to be expected for one of the positions of the movable element along the defined movement path. The detection can here in particular take place in one of the manners described above and can in particular be applied to one of the above-described locks.

DRAWINGS

The invention will be further explained in the following by way of example with reference to the Figures.

Figure 2:
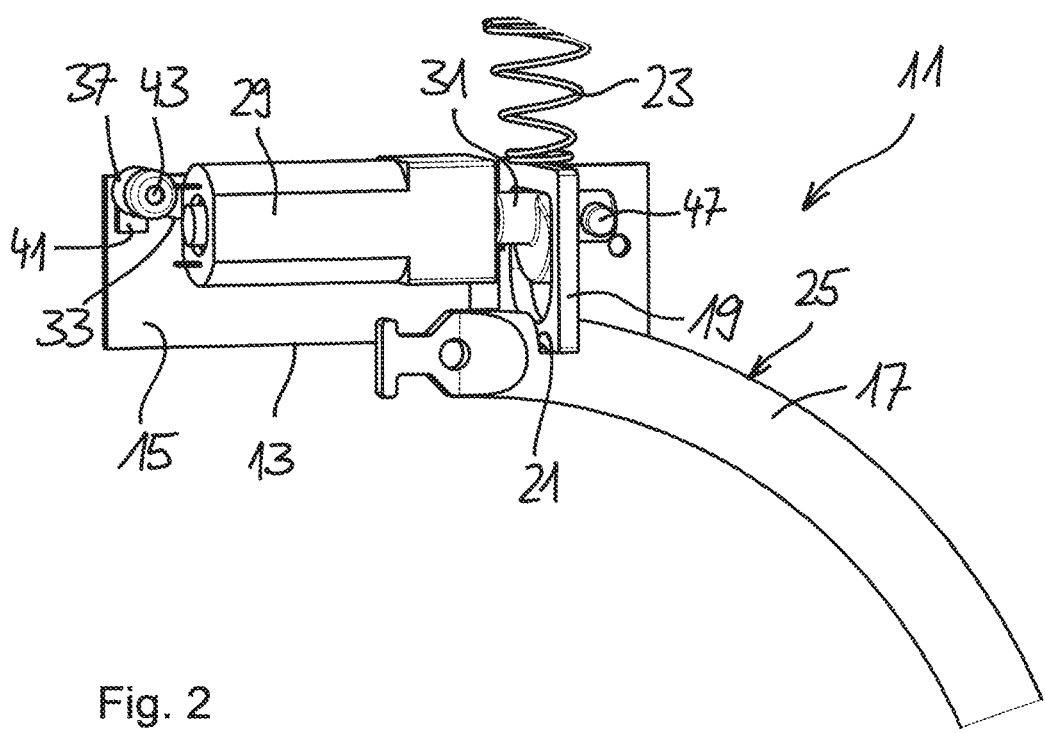
Figure 3:
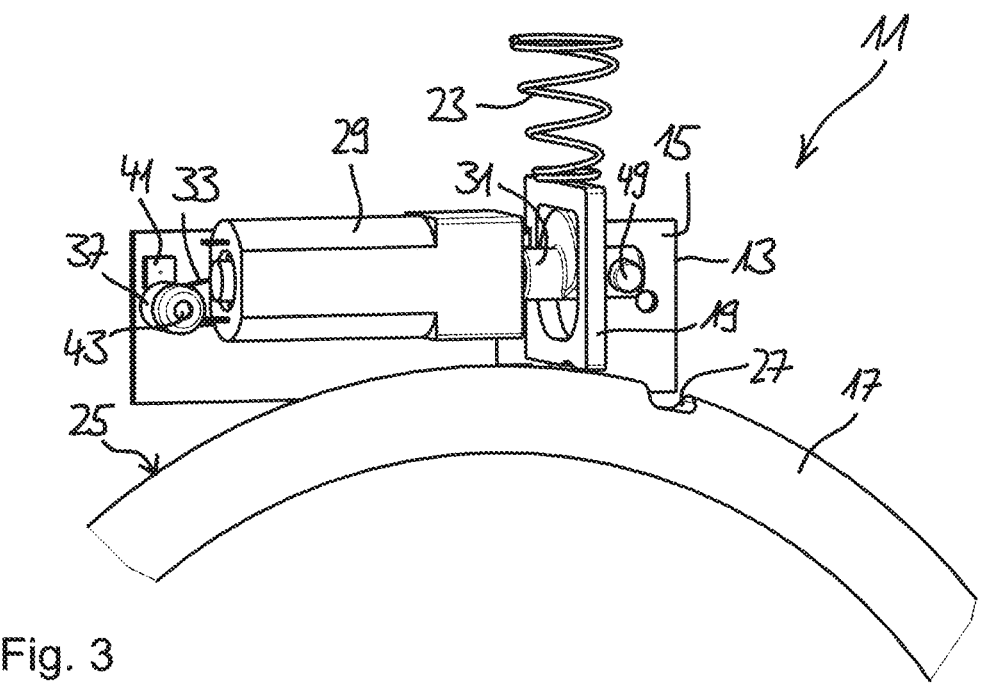
Figure 4:
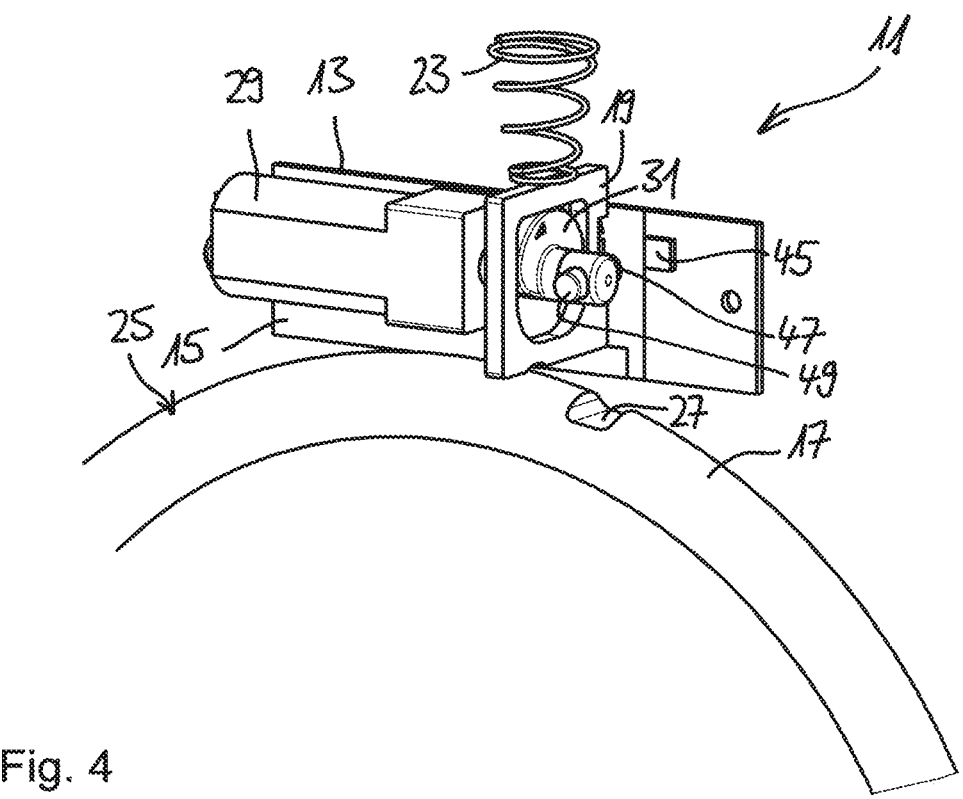
Figure 5:
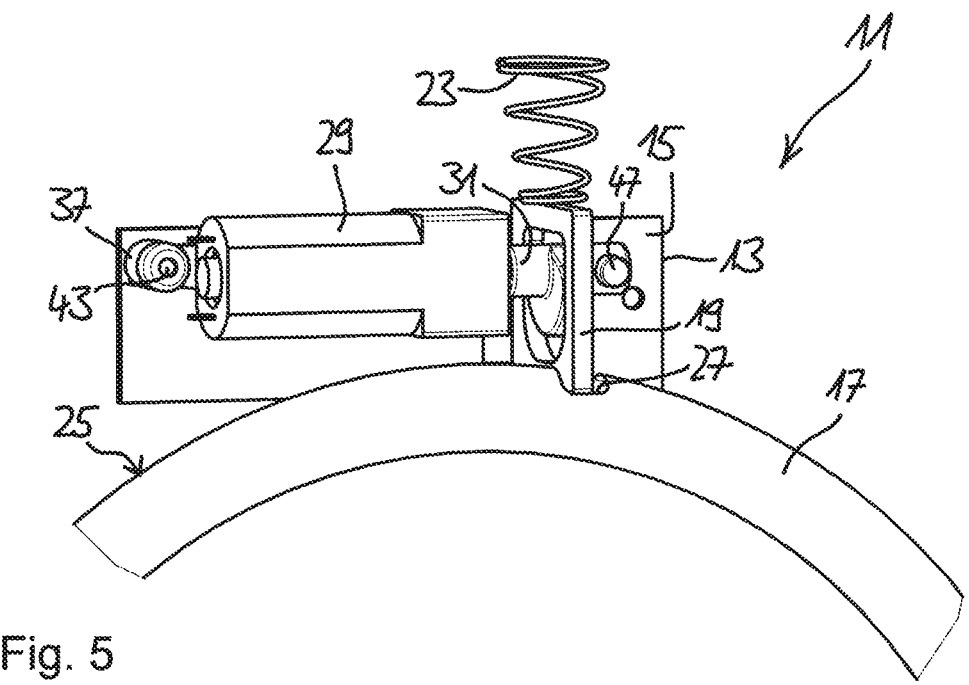
Figure 6:
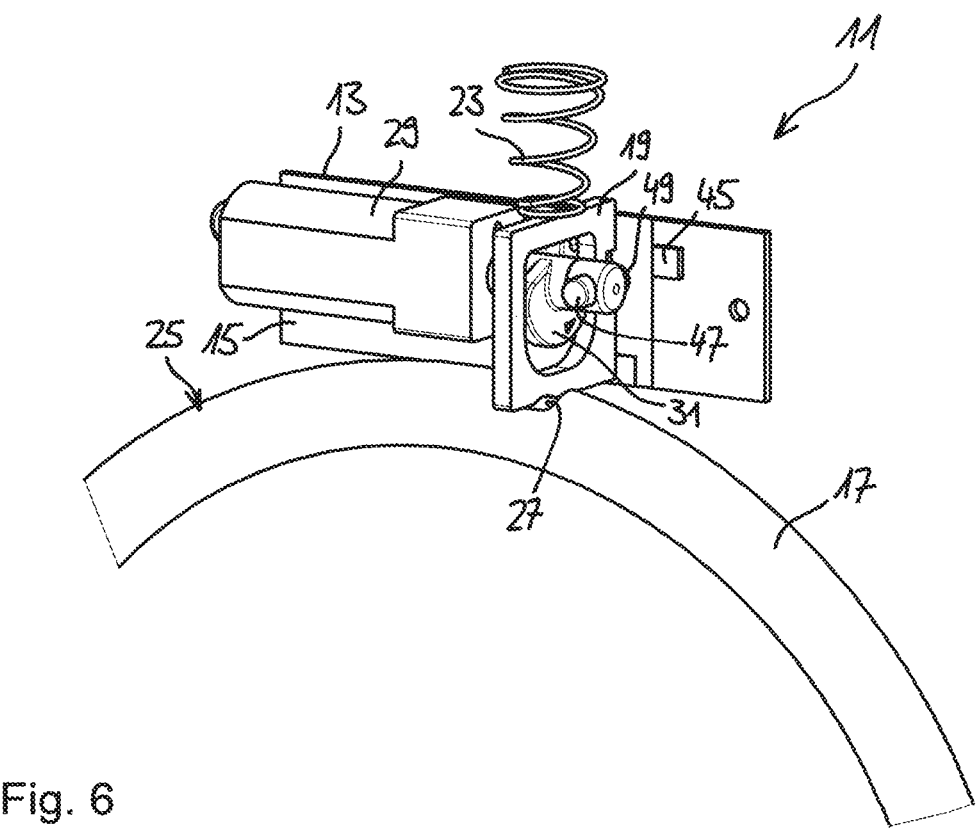

FIGS. 1 and 2 show in a perspective schematic representation parts of an embodiment of the two-wheeler lock in accordance with the invention from different angles of view, with a hoop of the lock being in a closed position and a latch of the lock being in a locked position;

FIGS. 3 and 4 largely correspond to FIGS. 1 and 2, but with the hoop adopting an intermediate position and with the latch being in an unlocked position; and FIGS. 5 and 6 largely correspond to FIGS. 1 and 2, but with the hoop being in an open position and with the latch being in a securing position.

DETAILED DESCRIPTION

FIGS. 1 to 6 show an embodiment of a two-wheeler lock in accordance with the invention. It is a partly automatic frame lock 11 in this embodiment. The frame lock 11 comprises a lock body 13 of which only a plate 15 bounding an inner space of the lock body 13 is shown in the Figures.

The frame lock 11 further comprises a hoop 17 that is the shape of a partial arc and that is respectively only partly shown and that is movable between the closed position shown in FIGS. 1 and 2 and the open position shown in FIGS. 5 and 6. In the state of the lock shown in FIGS. 3 and 4, the hoop 17 is in an intermediate position between the closed position and the open position. The hoop 17 is guided by the lock body 13 on a circular path along which the shape of a partial arc of the hoop 17 also extends. The frame lock 11 is configured to be arranged at a wheel of a two-wheeler such that the hoop 17 engages between the spokes of the wheel in the closed position and thereby blocks it; in contrast it releases the wheel in the open position. The hoop 17 can here be preloaded into the open position.

The general movability of the hoop 17 is restricted by a latch 19 of the lock 11 that is substantially movably supported radially to the shape of a partial arc of the hoop 27 at the lock body 13. The latch 19, when the hoop 17 is in its locked position, here engages into a first engagement recess 21 of the hoop 17 that extends radially from the outside into the hoop 17. In this state, that is shown in FIGS. 1 and 2, the latch 19 blocks the hoop 17 against a departure from the closed position by the engagement into the first engagement recess 21 and is to this extent in its locked position.

The latch 19 can be radially outwardly displaced from this locked position so that it moves out of the first engagement recess 21 and is arranged radially outside the outer radius of the hoop 17. The hoop 17 is thereby released for a departure from the closed position so that the latch to this extent is in its unlocked position. The unlocked position is here not necessarily restricted to a single position of the latch 19, but can rather comprise the total range of latch positions in which the hoop 17 is released for a movement from the closed position into the open position and back. The unlocked position of the latch 19 is shown, for example, in FIGS. 3 and 4.

The lock furthermore comprises a spring 23 that acts on the latch 19 and thereby preloads it against the hoop 17. As long as the latch 19 is not moved or held against this preload, the latch 19 therefore contacts an outer contour 25 of the hoop 17. Where the latch 19 respectively contacts along this contour 25 here depends on the respective position of the hoop 17. The first engagement recess 21 here forms that part of the contour 25 which the latch 19 contacts in the closed position of the hoop 17. In a region that adjoins the first engagement recess 21, the contour 25 has a substantially constant radius that corresponds to the outer radius of the hoop 17. The latch 19 contacts this region at intermediate positions of the hoop 17 between its closed position and its open position and thereby substantially adopts the unlocked position shown in FIGS. 3 and 4. In the unlocked position of the latch 19, the hoop 17 can be opened or closed, with the latch 19 sliding along the contour 25 of the hoop as long as it is not held as shown in FIGS. 3 and 4 by the eccentric mechanism 31 against the preload of the spring 23 at a spacing from the contour 25.

The contour 25 extends from the first engagement recess 21 over the region having a constant radius up to a second engagement recess 27 that extends radially from outside into the hoop 17 and into which the latch 19 engages due to the preload of the spring 23 when the hoop 17 is in the open position. The second engagement recess 27 has a smaller depth than the first engagement recess 21 with respect to the region of the contour 25 having a constant radius. The position of the latch 19 engaging into the second engagement recess 27 shown in FIGS. 5 and 6 thereby differs from the locked position in which it is located when it engages into the first engagement recess 21. The hoop 17 is prevented from departing from its open position by the engagement of the latch 19 into the second engagement recess 27 so that the hoop 17 is secured against closing. The latch position shown in FIGS. 5 and 6 to this extent represents a securing position of the latch 19 to be distinguished from the locked position and the unlocked position.

The latch 19 can be displaced radially outwardly in a motorized manner with respect to the shape of a partial arc of the hoop 17 against the preload of the spring 23. A drive motor 29 is provided for this purpose that is configured as an electric motor in the embodiment shown by way of example. An output shaft of the drive motor 29 drives an eccentric mechanism 31 that engages into an opening of the substantially disk-shaped latch 19 so that the latch 19 can be radially outwardly displaced against the preload in dependence on the rotational position of the eccentric mechanism 31 and can generally also be held in a specific position. The drive motor 29 is, however, only used to release the hoop 17 for a departure from the closed position (FIGS. 1 and 2) or of the open position (FIGS. 5 and 6) in that the latch 19 is briefly radially outwardly displaced from its locked position (FIGS. 1 and 2) or from its securing position (FIGS. 5 and 6) so that the engagement of the latch 19 into the first engagement recess 21 or into the second engagement recess 27 is canceled. As soon as the hoop 17 has thereupon moved out of the closed position or the open position, the drive motor 29 can be deactivated so that the latch 19 is again urged against the hoop 17 by the preload of the spring 23 and contacts the region of the contour 25 having a constant radius. The hoop 17 is thereby released for a movement between its closed position and its open position.

Since the latch 19 contacts the contour 25 as a result of the preload as long as it is not temporarily displaced or held against the preload, the state of the hoop 17 can also be determined with reference to the respective position of the latch 19. If the latch 19 is in the locked position, the hoop 17 can only be in the closed position. In a corresponding manner, the hoop 17 can only be in the open position when the latch 19 is in the securing position. If the latch 19 is, in contrast, in the unlocked position, in particular in the position in which it contacts the contour 25 having a constant radius, the hoop 17 is in an intermediate position between the open position and the closed position.

Which position of the latch 19 and of the eccentric mechanism 31 is respectively present is detected by means of two magnetic sensors 41, 45. In this respect, the sensor 41 by means of which the latch position is detected does not cooperate directly with the latch 19 or with a permanent magnet arranged thereat, but rather with a permanent magnet 43 that is provided at a lever 33 pivotably supported about a pivot point behind the drive motor 29 at the lock body 13 (cf. in particular FIG. 3). The lever 33 is configured as a flat, straight bar that is arranged substantially in parallel with the drive motor 29 and whose ends form a coupling section (hidden by the drive motor 29 in the Figures) or a deflection section 37. The lever 33 is movement-coupled to the latch 19 via the coupling section so that the lever 33 is pivoted about the pivot point on a displacement of the latch 19. The movement coupling of the lever 33 with the latch 19 in this respect takes place in that the coupling section engages into a cutout of the latch 19.

Since the coupling section is provided at a first end of the lever 33 and the deflection section 37 is provided at a second end of the lever 33 opposite the first ends at a spacing from the pivot point that is approximately twice as large as the coupling section, the deflection section 37 executes a movement that is approximately twice as large in comparison therewith on a movement of the coupling section. In this manner, the positions of the permanent magnet 43 defining the deflection section 37 that correspond to the locked position, to the unlocked position, and to the securing position of the latch 19, differ more from one another than these latch positions themselves differ from one another and can thereby be detected more reliably by means of the sensor 41.

The sensor 41 is a magnetic sensor that is configured for a three-dimensional magnetic detection, for example a 3D magnetic field sensor, in particular a 3D Hall sensor. The sensor 41 can thus precisely detect the magnetic field of the permanent magnet 43 and thereby its position in space. In this manner, the three positions of the deflection section 37 of the lever 33 that correspond to the locked position, to the unlocked position, and to the securing position of the latch 19 due to the movement coupling of the coupling section of the lever 33 to the latch 19 can be reliably distinguished by means of a single sensor 41.

The lock 11 furthermore has a further magnetic sensor 45 that is likewise configured for a three-dimensional magnetic detection and which is likewise, for example, a 3D magnetic field sensor, in particular a 3D Hall sensor. This sensor 45 cooperates with a permanent magnet that is provided at the eccentric mechanism 31, that rotates together with the eccentric mechanism 31, and that is formed by two individual permanent magnets 47, 49. The two individual permanent magnets 47, 49 are coaxially aligned with one another so that their magnetic north poles and south poles are on a straight line and alternate with one another along the straight line. In other words, the two permanent magnets 47, 49 are identically aligned with one another with respect to their polarity, therefore attract one another along their common longitudinal extent along said straight line, and can be considered together as a single continuous permanent magnet whose poles are radially aligned in mutually opposite directions with respect to the axis of rotation of the eccentric mechanism 31.

The mutual magnetic attraction of the two permanent magnets 47, 49 can also be used for their fastening to the eccentric mechanism 31. For this purpose, the eccentric mechanism 31 can have two coaxial receivers, in particular in the form of a respective bore, that are aligned radially opposite one another, that are only separated by a thin wall or that are even connected so that they form a continuous passage, with a reduction in diameter then being provided in the passage on the transition between the two receivers. The permanent magnets 47, 49 can then be inserted into a respective one of the receivers from opposite sides with different poles facing toward one another so that they mutually attract up to and against the wall or the diameter reduction and are thus held in a stable manner with reliable positioning in the receivers.

A neutral position of the eccentric mechanism 31 is shown in FIGS. 1 and 2 and 5 and 6 in which the eccentric mechanism 31 does not counteract the preload effected by the spring 23 so that the latch 19 contacts the contour 25 of the hoop 17, in particular engages into one of the engagement recesses 21, 27 in dependence on the position of the hoop 17. In this neutral position, the one pole of the one permanent magnet 47 of the two permanent magnets 47, 49 that together form the permanent magnet arranged at the eccentric mechanism 31 is aligned in the direction of the further magnetic sensor 45, while the opposite pole of the other permanent magnet 49 faces away from the sensor 45.

In contrast, an unblocked position of the eccentric mechanism 31 is shown in FIGS. 3 and 4 in which the eccentric mechanism 31 is rotated by 180° with respect to the neutral position. In the unblocked position, the eccentric mechanism 31 urges the latch 19 against the preload of the spring 23 away from the hoop 17 so that the latch 19 at least temporarily does not contact the contour 25 of the hoop 17. If the latch 19 has previously engaged into one of the engagement recesses 21, 27, it is thereby moved out of the respective engagement recess 21, 27 so that the hoop 17 is released for a movement out of the closed position into the open position or vice versa. To this extent, the latch 19 is displaced into its unlocked position by rotating the eccentric mechanism 31 into the unblocked position. As a result of the half rotation of the eccentric mechanism 31, in its unblocked position the one permanent magnet 47 is no longer aligned in the direction toward the further magnetic sensor 45, but rather the other permanent magnet 49, so that the magnetic field generated by the permanent magnets 47, 49 has just reversed its polarity. The neutral position and the unblocked position of the eccentric mechanism 31 can therefore be detected by means of the sensor 45 and can be reliably distinguished from one another with reference to the respective polarity of the magnetic field generated by the two permanent magnets 47, 49.

Since the sensors 41, 45 are configured for a three-dimensional magnetic detection, not only two or three single positions can be detected, but rather the total respective movement extent of the permanent magnet 43 arranged at the deflection section 37 of the lever 33 or of the permanent magnet formed by the two permanent magnets 47, 49 and arranged at the eccentric mechanism 31. The movement paths on which the permanent magnets 43 or 47 and 49 move are here unambiguously defined, do not change, and cannot be departed from, bur can only be run through in one direction and in the direction opposite thereto. Only those measured values are therefore to be expected as measured values that are detected by means of the sensors 41, 45 that correspond to a magnetic field that results from a position of the respective permanent magnet 43, 47, or 49 along the respective defined movement path. However, deviations from these measured values to be expected can also be determined by means of the 3D magnetic sensors 41, 45. Such deviations can be an indication that a permanent magnet 43, 47, 49 or the movable element at which it is arranged runs through an irregular movement path or that a magnetic field acts on the lock 11 from outside the lock 11 that is not provided on a regular use of the lock 11. A conclusion can therefore be drawn from such deviations that a manipulation attempt is present.

Positions or movements of the movable element deviating from the defined movement path and/or manipulation attempts made by means of external magnets can therefore be determined by sensors 41, 45 that are configured for a three-dimensional magnetic detection and are used for detecting different positions of an element of a lock 11 movable along a defined movement path. This in particular makes it possible to uncover such manipulation attempts and to foil them where possible. For this purpose, the sensors 41, 45 are connected to an evaluation apparatus, not shown, that receives and evaluates measured values from the sensors 41, 45. If no agreement of the detected measured values with the measured values to be expected can be determined, the evaluation apparatus controls an alarm apparatus, likewise not shown, to output an alarm that can draw attention to the manipulation attempt and/or can trigger countermeasures. The lock 11 has a comparatively substantially improved security with respect to manipulation attempts by such a configuration.

REFERENCE NUMERALS 11 frame lock
13 lock body
15 plate
17 hoop
19 latch
21 first engagement recess
23 spring
25 contour
27 second engagement recess
29 drive motor
31 eccentric mechanism
33 lever
37 deflection section
41 sensor
43 permanent magnet
45 sensor
47 permanent magnet
49 permanent magnet

What is claimed is:

1. A two-wheeler lock, having a sensor (41, 45) for detecting different positions of a moveable element of the lock movable along a defined movement path,
   wherein the movable element has a permanent magnet (43, 47, 49) and the sensor (41, 45) is configured as a magnetic sensor,
   wherein the magnetic sensor (41, 45) is configured for a three-dimensional magnetic detection to detect positions or movements of the movable element differing from the defined movement path;
   wherein the defined movement path is a predetermined elongate path of travel for the moveable element;
   wherein the magnetic sensor is configured to detect positions or movement of the moveable element that are transverse to or deviate from the predetermined elongate path of travel;
   wherein the three-dimensional magnetic detection of the magnetic sensor includes detection of both strength and spatial orientation of a magnetic field.

2. A two-wheeler lock in accordance with claim 1, wherein the movable element is
   a hoop (17) movable between an open position and a closed position;
   a latch (19) movable between a locked position and an unlocked position to latch the hoop (17) in the closed position;
   a transmission element (31) for the drive-effective coupling of the latch (19) or of the hoop (17) to a drive motor (29) of the lock; and/or
   a coupling element (33) movement-coupled to the latch (19), to the hoop (17), or to the transmission element (31).

3. A two-wheeler lock in accordance with claim 1, wherein the magnetic sensor (41, 45) is configured as a 3D magnetic sensor or as a 3D Hall sensor.

4. A two-wheeler lock in accordance with claim 1, wherein the movable element is supported such that it has a single degree of freedom.

5. A two-wheeler lock in accordance with claim 1, further having an evaluation apparatus that is configured to evaluate a measured magnetic value detected by means of the sensor (41, 45) with respect to an agreement with a measured value to be expected for one of the positions of the movable element along the defined movement path.

6. A two-wheeler lock in accordance with claim 5, further comprising an alarm apparatus for outputting an alarm, with the evaluation apparatus being configured to control the alarm apparatus to output an alarm when no agreement is determined on an evaluation of a detected measured value with a measured value to be expected for one of the positions of the movable element along the defined movement path.

7. A two-wheeler lock in accordance with claim 1, wherein the two-wheeler lock is a frame lock (11).

8. A two-wheeler lock in accordance with claim 1, wherein the two-wheeler lock is drivable in a motorized manner.

9. A method of detecting manipulation attempts at a two-wheeler lock, having a sensor (41, 45) for a three-dimensional magnetic detection of different positions of a moveable element of the lock movable along a defined movement path wherein the defined movement path is a predetermined elongate path of travel for the moveable element,
   wherein the method comprises the following steps:
   detecting a magnetic measured value by means of the sensor (41, 45), wherein the three-dimensional magnetic detection of the measured value by the magnetic sensor includes detection of both strength and spatial orientation of a magnetic field,
   evaluating the detected measured value with respect to an agreement with a measured value to be expected for one of the positions of the movable element along the defined movement path, wherein the measured value to be expected is disposed along the predetermined elongate path of travel,
   associating a respective position of the movable element with the measured value when an agreement is present between the measure value and the measured value to be expected; and,
   determining a manipulation attempt when the measured value indicates a position or movement of the moveable element transverse or deviating from the predetermined elongate path of travel and the agreement is not present.

10. A method in accordance with claim 9, wherein the movable element is
   a hoop (17) movable between an open position and a closed position;
   a latch (19) movable between a locked position and an unlocked position to latch the hoop (17) in the closed position;
   a transmission element (31) for the drive-effective coupling of the latch (19) or of the hoop (17) to a drive motor (29) of the lock; and/or a coupling element (33) movement-coupled to the latch (19), to the hoop (17), or to the transmission element (31).

11. A method in accordance with claim 9, further comprising:

outputting an alarm if a manipulation attempt has been determined.

12. Use of a sensor (41, 45) configured for a three-dimensional magnetic detection in a two-wheeler lock, the sensor (41, 45) detecting different positions of an element of the lock movable along a defined movement path wherein the defined movement path is a predetermined elongate path of travel for the moveable element;

for detecting manipulation attempts with reference to a deviation of a measured value detected by means of the sensor (41, 45) from a measured value to be expected for one of the positions of the movable element along the predetermined elongate path of travel;

wherein the measured value to be expected is disposed along the predetermined elongate path of travel, wherein the measured value detected indicates a position or movement of the moveable element transverse or deviating from the predetermined elongate path of travel, wherein the measured value detected by the magnetic sensor includes detection of both strength and spatial orientation of a magnetic field.

13. A two-wheeler lock, having a sensor (41, 45) for detecting different positions of a moveable element of the lock movable along a defined movement path, wherein the movable element has a permanent magnet (43, 47, 49) and the sensor (41, 45) is configured as a magnetic sensor, wherein the magnetic sensor (41, 45) is configured for a three-dimensional magnetic detection to detect manipulation attempts carried out by means of external magnets;

wherein the defined movement path is a predetermined elongate path of travel for the moveable element, wherein the three-dimensional magnetic detection of the magnetic sensor includes detection of both strength and spatial orientation of a magnetic field.

\* \* \* \* \*